United States Patent
Terauchi

(10) Patent No.: US 8,305,453 B2
(45) Date of Patent: Nov. 6, 2012

(54) IMAGING APPARATUS AND HDRI METHOD

(75) Inventor: Masakazu Terauchi, Tochigi (JP)

(73) Assignee: Pentax Ricoh Imaging Company, Ltd., Tokyo (JP)

( * ) Notice: Subject to any disclaimer, the term of this patent is extended or adjusted under 35 U.S.C. 154(b) by 232 days.

(21) Appl. No.: 12/782,850

(22) Filed: May 19, 2010

(65) Prior Publication Data

US 2010/0295962 A1  Nov. 25, 2010

(30) Foreign Application Priority Data

May 20, 2009 (JP) .................. 2009-122105

(51) Int. Cl.
- *H04N 5/228* (2006.01)
- *H04N 5/262* (2006.01)
- *G06K 9/32* (2006.01)

(52) U.S. Cl. ........... 348/208.12; 348/208.99; 348/208.1; 348/208.6; 348/222.1; 348/239; 382/293; 382/294

(58) Field of Classification Search ............. 348/207.99, 348/207.1, 208.99–208.16, 218.1, 222.1, 348/229.1–230.1, 231.99, 231.2, 239, 345, 348/349–350, 352–356, 362–367; 382/190, 382/206, 209, 254, 276, 284–289, 291, 293–296, 382/298–299

See application file for complete search history.

(56) References Cited

U.S. PATENT DOCUMENTS

| | | | | |
|---|---|---|---|---|
| 6,122,004 A | * | 9/2000 | Hwang | ........ 348/208.13 |
| 6,952,234 B2 | | 10/2005 | Hatano | |
| 2002/0154829 A1 | * | 10/2002 | Tsukioka | ........ 382/254 |
| 2003/0071908 A1 | * | 4/2003 | Sannoh et al. | ........ 348/345 |
| 2004/0207743 A1 | * | 10/2004 | Nozaki et al. | ........ 348/333.12 |
| 2004/0239779 A1 | * | 12/2004 | Washisu | ........ 348/239 |
| 2006/0132612 A1 | * | 6/2006 | Kawahara | ........ 348/208.6 |
| 2006/0182433 A1 | * | 8/2006 | Kawahara et al. | ........ 396/123 |
| 2008/0100721 A1 | * | 5/2008 | Ayaki | ........ 348/222.1 |
| 2008/0231715 A1 | * | 9/2008 | Endo | ........ 348/208.99 |
| 2008/0284901 A1 | * | 11/2008 | Misawa | ........ 348/349 |
| 2009/0147107 A1 | * | 6/2009 | Kawahara et al. | ........ 348/240.2 |
| 2009/0213235 A1 | * | 8/2009 | Watanabe | ........ 348/208.4 |

(Continued)

FOREIGN PATENT DOCUMENTS

JP  5-7336  1/1993

(Continued)

OTHER PUBLICATIONS

Masakazu Terauchi, "Imaging Apparatus and Image Composition Method", U.S. Appl. No. 12/782,841, filed May 2010, PP.

*Primary Examiner* — Jason Chan
*Assistant Examiner* — Michael Osinski
(74) *Attorney, Agent, or Firm* — Greenblum & Bernstein, P.L.C.

(57) ABSTRACT

An imaging apparatus includes an image sensor and a processor that merges together a plurality of images captured by said image sensor to produce a composite image. The positions or the plurality of images being adjusted to reduce displacement of a reference area that is determined within each one of said plurality of images before the plurality of images is merged together. The reference area includes at least one of an in-focus area determined by a focusing operation, a face area determined by face-sensing processes, a predetermined-color area determined by white-balance information and predetermined color information, and a predetermined-brightness area determined by photometry.

3 Claims, 5 Drawing Sheets

U.S. PATENT DOCUMENTS

2009/0316016 A1* 12/2009 Iwamoto .................. 348/222.1
2009/0322885 A1* 12/2009 Ogasawara et al. ........... 348/169
2009/0322934 A1* 12/2009 Ishii ........................... 348/345
2011/0090369 A1*  4/2011 Yanagita et al. .............. 348/234
2011/0242363 A1* 10/2011 Nozaki et al. ............. 348/231.99
2011/0285897 A1* 11/2011 Fujii ............................ 348/345
2012/0105684 A1*  5/2012 Nozaki et al. .............. 348/240.3

FOREIGN PATENT DOCUMENTS

JP          10-243288          9/1998

* cited by examiner

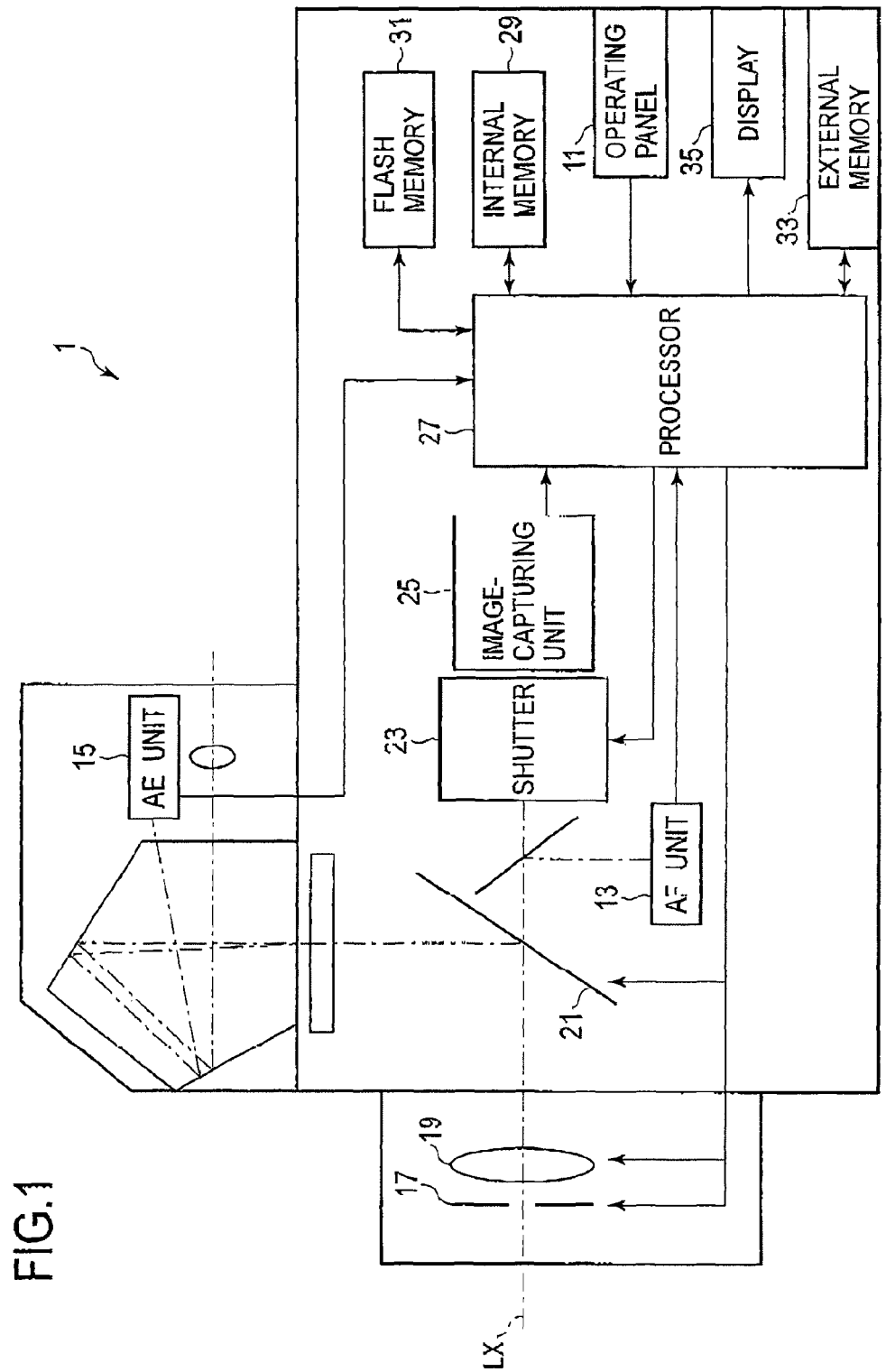

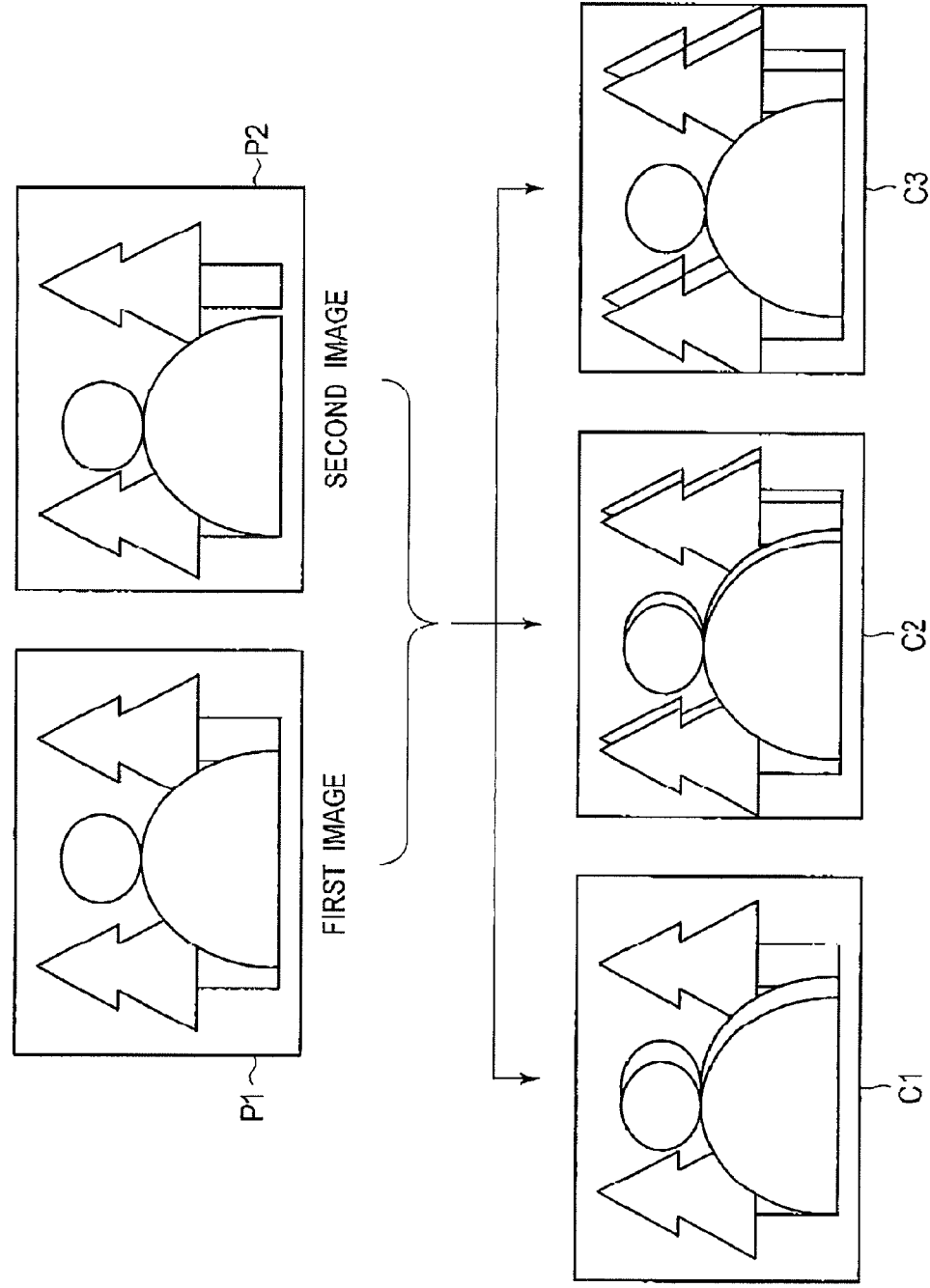

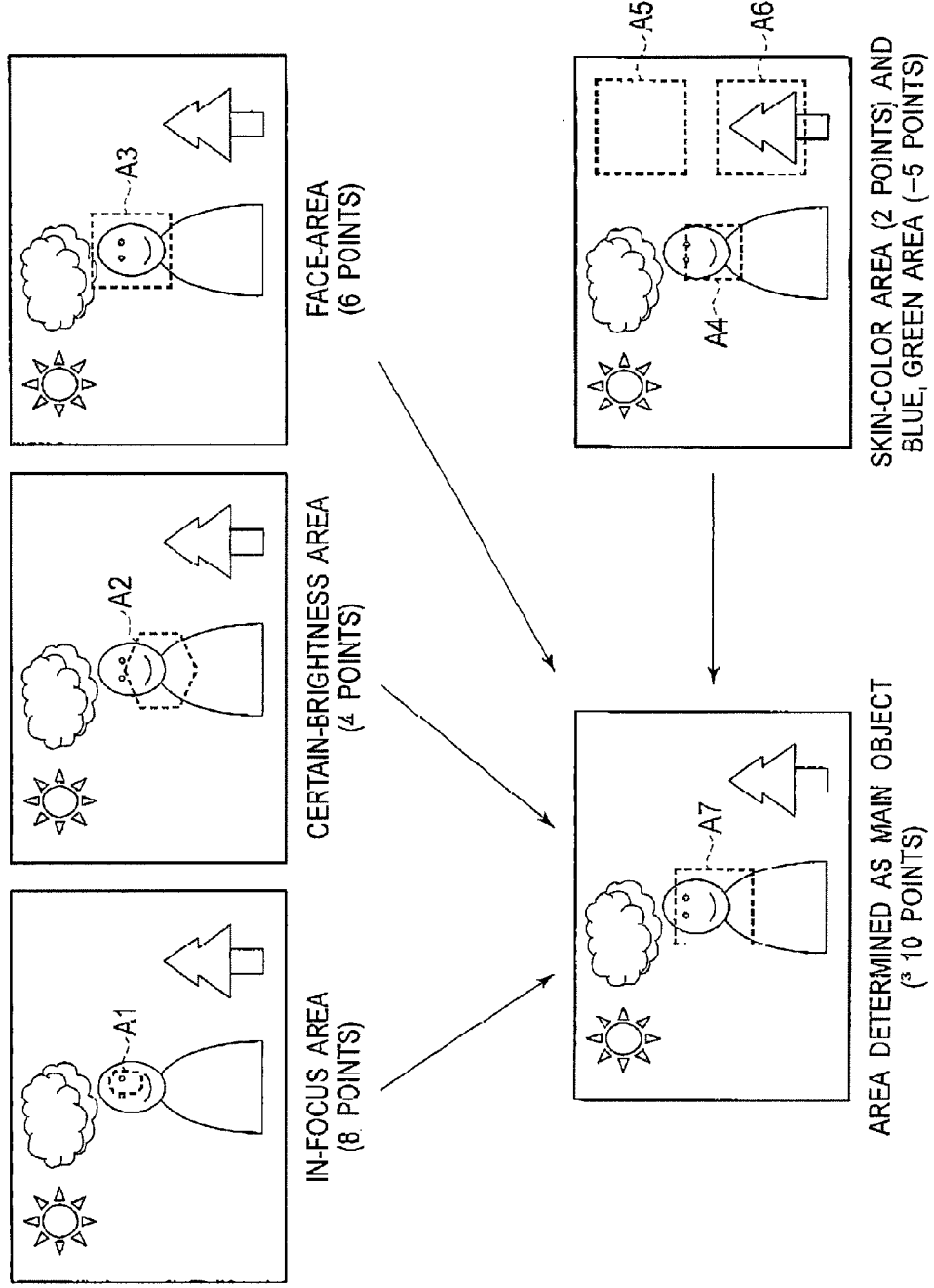

IMAGING APPARATUS AND HDRI METHOD

BACKGROUND OF THE INVENTION

1. Field of the Invention

The present invention relates to an apparatus and method for merging together a plurality of images. In particular, an apparatus and method that merge together images to produce a composite image having a wide dynamic range of luminance may be referred to as high dynamic range imaging (HDRI).

2. Description of the Related Art

Conventionally, a set of high dynamic range imaging techniques is provided that merges together a plurality of photographic images captured under different exposure parameters or values (i.e., under exposure bracketing) in order to generate an image having a wider dynamic range of luminance.

SUMMARY OF THE INVENTION

When any two images captured in any bracketing are shot at different settings, i.e., at different positions or angles, it is impossible to adjust the positions of every part of the two images in an image composition because the two images include parallax and the like. This situation may occur when image-capturing operations are carried out in unstable conditions, such as hand-held shooting. When the positions of the images are adjusted to minimize the total displacement, every part of the resulting composite image will include a small displacement.

An aspect of the present invention is to provide an imaging apparatus and an HDRI method that are able to adjust displacement of images, which are captured in bracketing, by minimizing displacement of a main photographing object.

According to the present invention, an imaging apparatus is provided that includes an image sensor and a processor that merges together a plurality of images captured by the image sensor to produce a composite image. The positions of the plurality of images being adjusted to reduce displacement of a reference area that is determined within each one of the plurality of images before the plurality or images is merged together. The reference area includes at least one of an in-focus area determined by a focusing operation, a face area determined by face-sensing processes, a predetermined-color area determined by white-balance information and predetermined color information, and a predetermined-brightness area determined by photometry.

Further, according to the present invention, an HDRI method is provided that merges a plurality of images captured by an image sensor to produce a composite image. The positions of the plurality of images being adjusted to reduce displacement of a reference area that is determined within each one of the plurality of images before the plurality of images is merged together. The reference area includes at least one of an in-focus area determined by a focusing operation, a face area determined by face-sensing processes, a predetermined-color area determined by white-balance information and predetermined color information, and a predetermined-brightness area determined by photometry.

BRIEF DESCRIPTION OF THE DRAWINGS

The objects and advantages of the present invention will be better understood from the following description, with reference to the accompanying drawings in which:

FIG. 1 is a block diagram schematically illustrating the general structure of an imaging apparatus of an embodiment of the present invention;

FIG. 3 illustrates examples of the image composition; and

FIG. 4 illustrates a concept of assigning a score to each type of reference area to determine whether an area corresponds to a main photographing object.

DESCRIPTION OF THE PREFERRED EMBODIMENTS

Figure 2A:
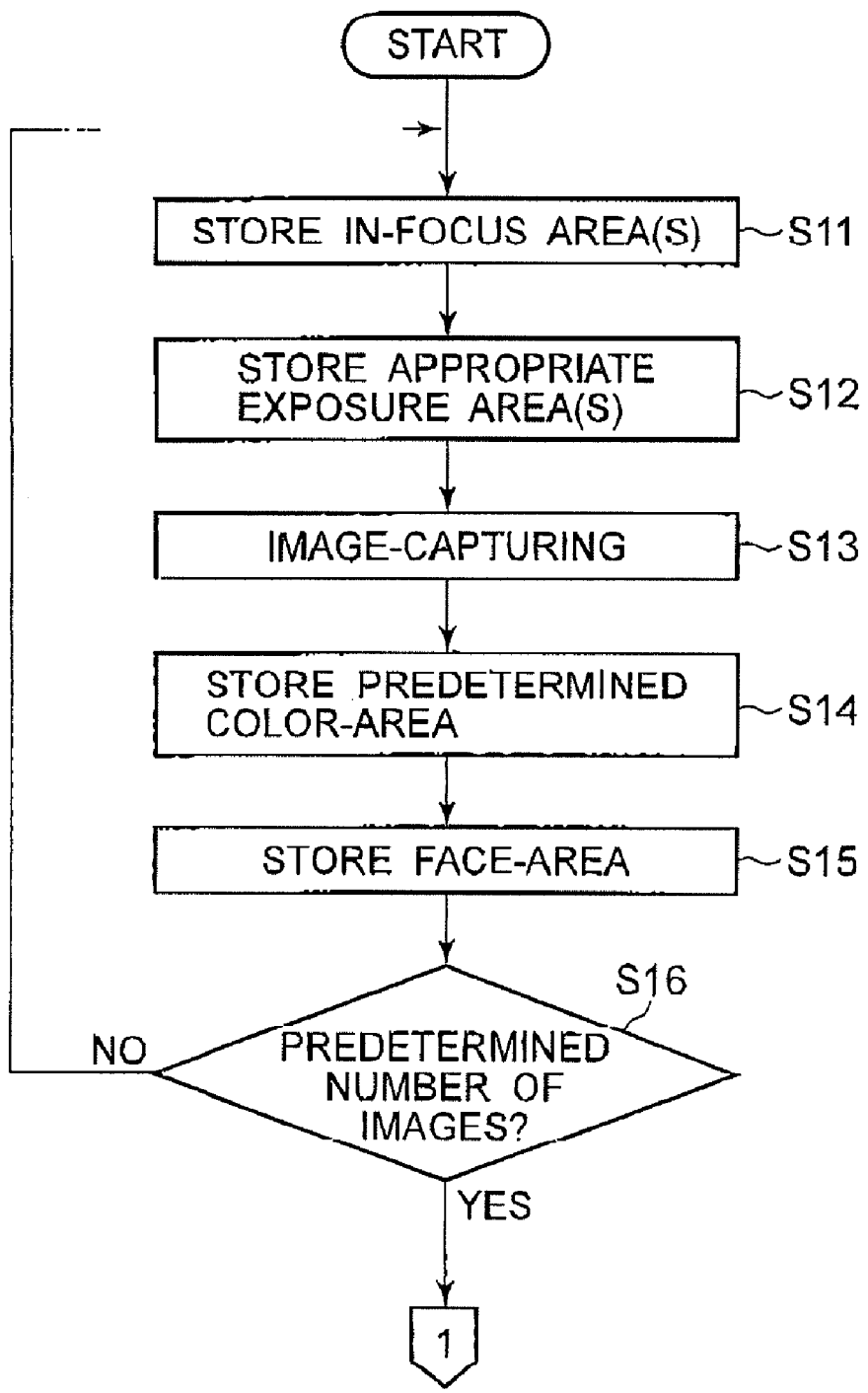
FIGS. 2A and 2B are a flowchart of an image-capturing operation in the HDR mode and the image composite process of the present embodiment.

The present invention is described below with reference to the embodiments shown in the drawings.

FIG. 1 is a block diagram schematically illustrating the general structure of an imaging apparatus 1 of an embodiment of the present invention. The imaging apparatus 1 may be a digital camera having a operating panel 11, an AF (autofocus) unit 13, au AE (auto exposure) unit 15, a stop 17, a lens 19, a mirror 21, a shutter 23, an image-capturing unit 25 including an image sensor such as a CCD or CMOS, a processor 27 such as a DSP and/or CPU, an internal memory 29, a flash memory 31, an external memory 33, and a display 35.

The operating panel 11 includes a release button and a mode-select key (not depicted). When the release button is half depressed, a photometry switch is activated and the AF unit 13 carries out a distance measurement while the AE unit carries out photometry. The result of the distance measurement may be fed into the processor 27 from the AF unit 13 to carry out a focusing operation. Further, the result of the photometry may be fed into the processor 27 from the AE unit 15 to calculate exposure parameters, such as a shutter speed and an f-number.

When the release button is fully depressed, the release switch is activated so that devices including the image-capturing unit 25 start an image-capturing operation. Namely, in the image-capturing operation the stop 17, the mirror 21, and the shutter 23 are respectively driven with appropriate timing to expose the image sensor of the imaging unit 25.

The imaging apparatus 1 includes an HDR (High Dynamic Range) mode and a Normal mode. Either the HDR mode or Normal mode is selected by manipulating the mode-select key. When the HDR mode is selected, a plurality of image-capturing operations is sequentially carried out under different exposure values (exposure bracketing). Hereinafter, this series of image-capturing operations may be referred to as a sequential image-capturing operation. A plurality of images captured by this sequential image-capturing operation is merged together to produce an image having a wide dynamic range. On the other hand, when the Normal mode is selected a single image-capturing operation is normally carried out.

The processor 27 performs image processing on image signals obtained in the image-capturing operation of the imaging unit 25. The processor 27 may further output either the processed or unprocessed image signals to the external memory 33, which may be detachable from the imaging apparatus 1, to store the corresponding image data in the external memory 33. Moreover, the image signal processed by the processor 27 may be fed into the display 35 and the corresponding image displayed on the screen.

When the HDR mode is set, the processor 27 controls each component to carry out the sequential image-capturing operation with each image being captured under different exposure values (exposure bracketing). Image signals obtained by the plurality of image-capturing operations are subjected to the above image processing and the images obtained in this exposure bracketing are merged together to produce a single composite image. Further, the internal memory 29 may temporarily store data during image processing. Furthermore, the flash memory 31 may store programs that execute operations performed in the imaging apparatus 1, such as the image composition process including the image position adjustment process, which will be described below.

The image position adjustment process accommodates displacement of the images captured in either the above sequential image-capturing operation or the exposure bracketing so as to merge the images to produce an HDR image in the image composition process. The image position adjustment process may use the coincidence between certain reference area(s) defined in the images to adjust the positions of the images. For example, the image processor 27 may compare images within in-focus areas extracted from each image captured by the above sequential image-capturing operation. The in-focus areas may be determined in the focusing operation carried out by the AF unit 13.

Additionally or alternatively, the image processor 27 may compare images within face areas determined in the face-sensing processes to accommodate displacement of images in the image composition process.

Additionally or alternatively, the image processor 27 may compare images within areas determined by a predetermined color to accommodate displacement of images in the image composition process. For example, the predetermined color may be a certain skin color, which may be determined from white-balance information obtained in the above image processing and predetermined color information.

Additionally or alternatively, the image processor 27 may compare images within areas having predetermined brightness in each one of the above captured images to accommodate displacement of the images in the image composition process. These areas having the predetermined brightness may be determined by the photometry carried out by the AE unit 15. One example of an area having the predetermined brightness is an area including pixels having medium luminance.

The above four types of areas, such as the in-focus area, the face area, the predetermined-color area, and the predetermined-brightness area, may generally be considered as including a main object of the photography. Therefore, an image position adjustment process with reference to those areas can minimize blurring of the main object due to the displacement of the images used in the image composition.

In the image position adjustment process, the images obtained by exposure bracketing are aligned by comparing the extracted images within the above extracted areas and evaluating their coincidence. Namely, each of the images may be relatively moved in order to find the position where the above coincidence is maximized.

In the present embodiment, the processor 27 may first compare the images of the in-focus areas. When this does not work, such as when the images in the in-focus areas do not have a sufficient degree of coincidence, the images of the face areas are compared to one another to adjust the positions of the images. Further, when the comparison of the images within the face areas does not work, the images within areas determined by the predetermined color are compared to one another to adjust the positions. Furthermore, when this does not work, the images within areas having the predetermined brightness are compared to one another to adjust the positions. Finally, when all of the above-mentioned position adjustments do not work, the complete areas of the captured images are compared with each other to adjust the positions of the images to produce the composite image. When the position adjustment is complete, the processor 27 merges the bracket images together.

With reference to the flowchart of FIGS. 2A and 2B, an image-capturing operation in the HDR mode, such as that of the sequential image-capturing operation and the image composition process of the present embodiment, which are executed by the processor 27, will be explained.

Figure 2B:
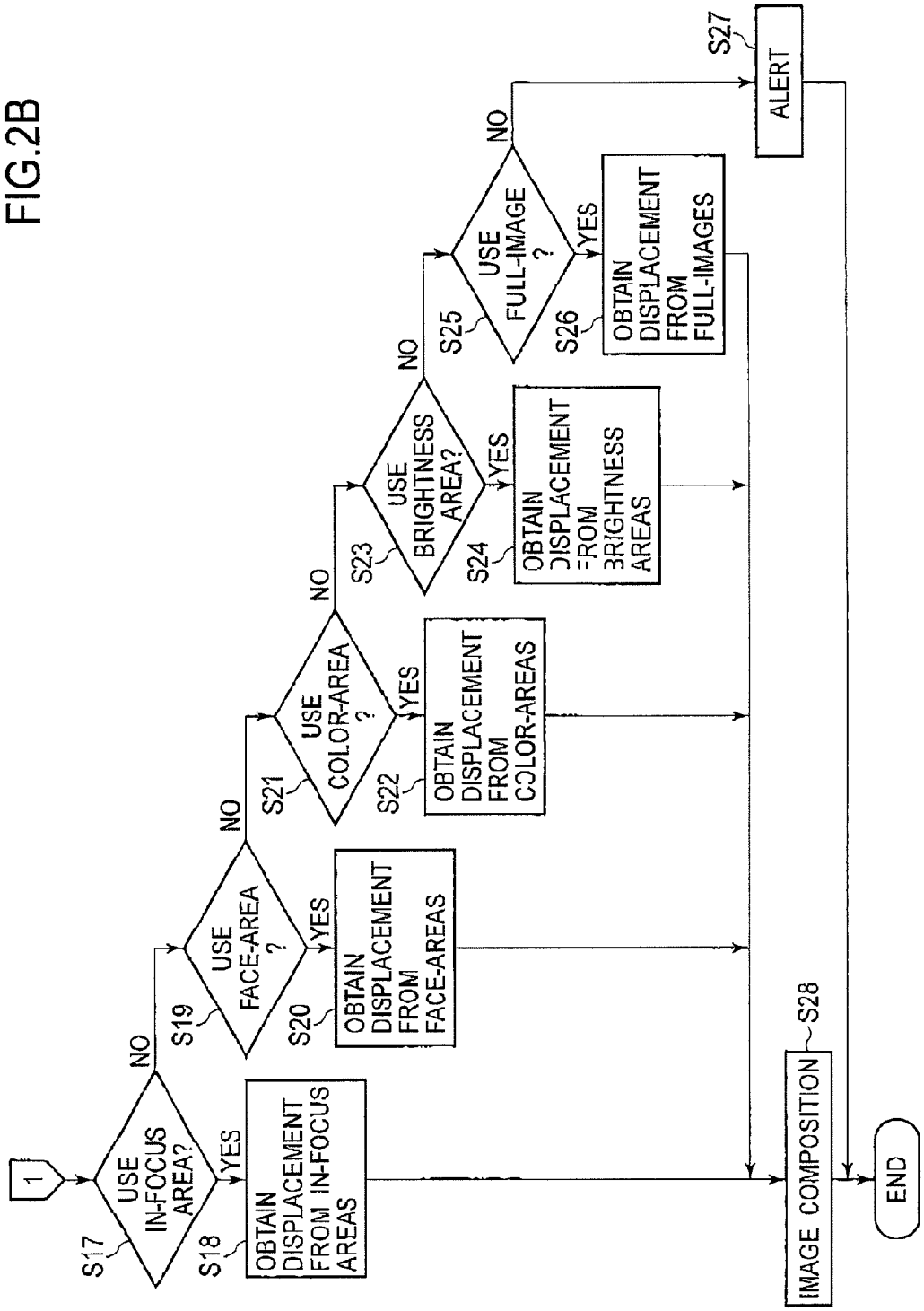

When the release button is fully depressed in HDR mode, the process of FIG. 2A begins. In Step S11, the processor 27 temporarily stores information of an in-focus area(s) in the internal memory 29. The information of the in-focus area(s) is obtained from the distance measurement operation that may be carried out when the release button is half depressed. In Step S12, the processor 27 temporarily stores information of an appropriately exposed area(s) based on the photometry operation in the internal memory 29, the photometry operation being carried out when the release button is half depressed.

In Step S13, the processor 27 actuates each component of the imaging apparatus 1 to perform an image-capturing operation. In Step S14, information on the area(s) having a predetermined color, which may be determined by white-balance information obtained from the image-processing and predetermined color information, such as a certain skin-color, is temporarily stored in the internal memory 29. In Step S15, information on the face area(s) determined by the face-sensing process is temporarily stored in the internal memory 29. In Step S16, the processor 27 determines whether the number of images captured in the sequential image-capturing operation or in the exposure bracketing has reached a predetermined minimum amount that is required to produce the composite image. When the number of images has already reached the predetermined amount, the process proceeds to Step S17. Otherwise, the process returns to Step S11 and the next image-capturing operation is carried out under a different exposure value.

In Step S17, the processor 27 compares the images using the in-focus areas extracted from each image captured in the above sequential image-capturing operation and evaluates the coincidence between the images within the in-focus areas to find the optimum relative positions where the coincidence among the images of the in-focus area is maximized. When the maximum value of the coincidence between the images of the in-focus areas is sufficiently high, it is determined that an appropriate image composition can be processed with reference to the in-focus areas, and the process proceeds to Step S18. In Step S18, the processor 27 obtains position-adjustment information necessary for adjusting the positions of the images from the relative positions discovered above, such as the displacement of the images. On the other hand, when it is determined in Step S17 that the maximum value of the coincidence is not sufficient, the position adjustment based on the in-focus areas is regarded as inappropriate and thus the process proceeds to Step S19.

In Step S19, the processor 27 compares the face areas within the images and evaluates the coincidence between the images within the face areas to find the optimum relative positions of the face area images, in addition to the process for the in-focus areas. When the maximum value of the coincidence between the face areas of the images is sufficiently high, the process proceeds to Step S20 and the position-adjustment information is obtained from the above search operation performed with respect to the face areas. When it is determined in Step S19 that the maximum value of the coincidence is not sufficiently high, the position adjustment process using the face areas is regarded as inappropriate and the process proceeds to Step S21.

In Step S21, the processor 27 compares the predetermined-color areas within the images and evaluates the coincidence between the images with respect to the certain-color areas to find the optimum relative positions of the certain-color area images, in addition to the process for the in-focus areas. When the maximum value of the coincidence between the images based on the certain-color areas is sufficiently high, the process proceeds to Step S22 and the position-adjustment information is obtained from the above search operation performed with respect to the certain-color areas. When it is determined in Step S21 that the maximum value of the coincidence is not sufficiently high, the position adjustment process using the certain-color areas is regarded as inappropriate and the process proceeds to Step S23.

In Step S23, the processor 27 compares the images within the certain-brightness areas and evaluates the coincidence between the images within the certain-brightness areas to find the optimum relative positions of the certain-brightness-area images, in addition to the process for the in-focus areas. When the maximum value of the coincidence between the images of the certain-brightness areas is sufficiently high, the process proceeds to Step S24 and the position-adjustment information is obtained from the above search operation performed on the certain-brightness areas. When it is determined in Step S23 that the maximum value of the coincidence is not sufficiently high, the position adjustment using the certain-brightness areas is regarded as inappropriate and the process proceeds to Step S25.

In Step S25, the processor 27 compares the entire part of each image (full images) captured in the exposure bracketing and evaluates the coincidence between the images to find the optimum relative position of each one of the full images, in addition to the process for the in-focus areas. When the maximum value of the coincidence between the images is sufficiently high, the process proceeds to Step S26 and the position-adjustment information is obtained from the above search operation performed on the images. When it is determined in Step S25 that the maximum value of the Coincidence is not sufficiently high, the position adjustment process using the full images is regarded as inappropriate and the process proceeds to Step S27. Namely, in this case image displacement during exposure bracketing may be too large for merging the images. Therefore, in Step S27 an alert message indicating that the image-position adjustment is not available is displayed on the screen of the display 35 and this HDR-mode image-capturing operation ends.

On the other hand, in Step S28, the processor 27 adjusts the positions of the images obtained in the sequential image-capturing operations or in the exposure bracketing. This image-position adjustment operation is performed with reference to the information (image displacement) obtained in either of Steps S18, S20, S22, S24 or S26, and the processor 27 merges the images together into a single composite image so that the substantial dynamic range of the composite image is extended. Further, the composite image produced in this process may be stored in the external memory 33 and/or displayed on the screen of the display 35.

FIG. 3 shows examples of the image composition. A first image P1 and a second image P2 are examples of images obtained in the sequential image-capturing operation or the exposure bracketing. When the position of the imaging apparatus 1 changes during exposure bracketing, the position of the viewpoint of the second image changes from the position where the first image was captured. Therefore, the positions of objects in the second image are respectively displaced from those positions in the first image and the composition of the first image and the composition of the second image differ slightly. Namely, every part of the first image and second image cannot be adjusted to match each other.

For example, the first and second images include a person at close range and trees at a distance in the background. Three images C1-C3 illustrated in the lower part of FIG. 3 are images depicting different ways in which the first and second images are overlaid. Namely, in the overlaid image C1 the image of the trees in the background is what is mainly adjusted between the first and second images. In this overlaid image, a gap between the background view of the images, such as the images of trees, are substantially reduced but a gap remains between the images at close range, such as the person's image. On the other hand, in the overlaid image C3, the image of the person at close range is what is mainly adjusted. In this overlaid image, a gap between images at close range, such as the person's image, are substantially reduced but a gap remains between the images in the background, such as the image of the trees. Further, in the overlaid image C2, an equal weight is applied to the adjustments of the image of the trees and the image or the person. In this case, displacement may be reduced at all points while at the same time a certain amount of displacement will remain at all points, so that all parts of the composite image turns out to be obscured.

In the present embodiment, the system determines area(s) that correspond to the main photographing object, and minimizes the displacement of these area(s) accordingly. Therefore, the displacement of the area(s) determined to be the main photographing object is minimized and a clear image of the object is obtained. For example, if an area(s) corresponding to the person at close range is determined to be the main object in the first and second images (P1 and P2 of FIG. 3), the composite image C3 is produced. Further, if an area(s) corresponding to the trees in the background is determined to be the main object in the first and second images P1 and P2, the composite image C1 is produced.

In the present embodiment, the determination of an area that may correspond to the main object of an image is carried out according to the following order of priority: (1) in-focus area, (2) face area, (3) predetermined-color area, and (4) predetermined-brightness area. This order is selected in consideration of the possibility of each area corresponding to the main object. However, it should be understood that the above priority order is only an example and not a limitation. Therefore, an order of priority other than the above order is also acceptable. Further, the order of priority may be manually selected by a user.

Furthermore, the determination of an area(s) corresponding to the main object may also be carried out by any combination selected from the above-mentioned areas: the in-focus area, the face-area, the predetermined-color area, and the predetermined-brightness area. An area corresponding to the main object may be determined by a score or weight assigned to each of the areas in a certain manner. Namely, the area(s) having relatively high score(s) may be determined to correspond to the main object.

With reference to FIG. 4, the above example using the score will be explained. In FIG. 4, examples of the in-focus area A1, the predetermined-brightness area A2, the face area A3, and the predetermined-color areas A4-A6 within an image are illustrated. In this example, eight points may be assigned to the in-focus area A1, six points to the face area A3, two points to the predetermined skin-color area A4, minus five points to the blue and green areas A5 and A6, and four points to an area with appropriate exposure, i.e., to the predetermined-brightness array A2. Further, the points or score of the areas A1-A6 are added at each position in the image. In this example, an area A7 with a score of ten or greater is determined as an area corresponding to the main object. Therefore, the position adjustment operation is carried out to minimize the displacement of this area.

Thereby, according to the above example, an area corresponding to the main object can be determined precisely. Further in the above example, the points can be control not only to give an advantage to a certain area (a reference area), such as the face-area, but also to give a disadvantage to a certain area (a reference area), such as the blue and green areas (which would correspond to a background rather than the main object).

The present embodiment is described as the plurality of images captured under different exposure values (in exposure bracketing), however, the images may be captured under the same exposure values. Namely, the present invention can also be applied to any bracketing other than exposure bracketing.

Although the embodiment of the present invention has been described herein with reference to the accompanying drawings, obviously many modifications and changes may be made by those skilled in this art without departing from the scope of the invention.

The present disclosure relates to subject matter contained in Japanese Patent Application No. 2009-122105 (filed on May 20, 2009), which is expressly incorporated herein, by reference, in its entirety.

The invention claimed is:

1. An imaging apparatus, comprising:
an image sensor; and
a processor that merges together a plurality of images captured by said image sensor to produce a composite image;
the positions of the plurality of images being adjusted to reduce displacement of a reference area that is determined within each one of the plurality of images before the plurality of images is merged together; and
the reference area including at least one of an in-focus area determined by a focusing operation, a face area determined by face-sensing processes, a predetermined-color area determined by white-balance information and predetermined color information, and a predetermined-brightness area determined by photometry,
wherein the reference area is alternatively selected in a sequential order of the in-focus area, the face area, the predetermined-color area, and the predetermined-brightness area, such that a subsequent area within the order is selected only after the position adjustment using current area within the order is determined to be inappropriate.

2. An imaging apparatus comprising:
an image sensor; and
a processor that merges together a plurality of images captured by said image sensor to produce a composite image;
the positions of the plurality of images being adjusted to reduce displacement of a reference area that is determined within each one of the plurality of images before the plurality of images is merged together; and
the reference area including at least one of an in-focus area determined by a focusing operation, a face area determined by face-sensing processes, a predetermined-color area determined by white-balance information and predetermined color information, and a predetermined-brightness area determined by photometry,
wherein the reference area is defined by a combination of at least two of the in-focus area, the face area, the predetermined-color area, and the predetermined-brightness area,
wherein the in-focus area, the face area, the predetermined-color area, and the predetermined-brightness area are respectively weighted, and the reference area is defined with reference to a total weight of a combination area comprising the combination of at least two of the in-focus area, the face area, the predetermined-color area, and the predetermined-brig area.

3. An HDRI method, comprising:
merging a plurality of images captured by an image sensor to produce a composite image;
the positions of the plurality of images being adjusted to reduce displacement of a reference area that is determined within each one of the plurality of images before the plurality of images is merged together; and
the reference area including at least one of an in-focus area determined by a focusing operation, a face area determined by face-sensing processes, a predetermined-color area determined by white-balance information and predetermined color information, and a predetermined-brightness area determined by photometry,
wherein the reference area is alternatively selected in a sequential order of the in-focus area, the face area, the predetermined-color area, and the predetermined-brightness area, such that a subsequent area within the order is selected only after the position adjustment using a current area within the order is determined to be inappropriate.

* * * * *